2,779,727

2,779,727
METHOD FOR TREATING TITANIUM METAL

George R. Couch, North Plainfield, N. J., and William E. Mooz, Huntsville, Ala., assignors to National Lead Company, New York, N. Y., a corporation of New Jersey No Drawing. Application July 27, 1954,
Serial No. 446,172

3 Claims. (Cl. 204—146)

This invention relates to a method for treating titanium metal sponge. More particularly, it relates to a method for separating magnesium metal from titanium metal.

When titanium metal is produced by a process such as that described, for example, in U. S. Patent No. 2,205,854 wherein titanium tetrachloride and an active reducing metal such as magnesium are reacted at elevated temperatures to form titanium metal and magnesium chloride, the titanium metal, which is formed, is usually contaminated with magnesium chloride and magnesium metal. Before the titanium metal product can be further utilized in the various commercial applications for which it may be suitable, it is necessary for such contaminant to be separated from the titanium metal. Such materials may be separated from the titanium metal by means of a leaching operation employing water or a dilute acid solution as the leaching medium. It is possible through the employment of proper water leaching procedures to effectively remove substantially all of the water soluble impurities such as, for example, magnesium chloride and by employing a dilute acid in the leaching step it is further possible to remove the metallic impurities such as magnesium metal. Because of the economics involved it has generally been the practice to use an acidic solution of, for example, hydrochloric or sulphuric acid in such leaching operation.

However, in subsequent methods of processing and in particular, the step of melting the leached titanium metal by an arc melting operation in order to cast it into suitable forms for commercial utilization, it has been observed that often undesirable difficulties have been encountered, and that for some reason the titanium metal product is not amenable to such arc melting procedures. The reasons for this are not obvious; however, it is possible that after the dilute acid leaching operation the titanium metal product may contain some adsorbed gas such as, for example, hydrogen and that the adsorbed gaseous material is released during the subsequent arc melting operation. Such action results in the loss of arc stability and in the spattering of metal which is observed and which results in an unsatisfactory arc melting operation.

It is desirable to remove the water soluble salts from the impure titanium metal product before carrying out the process of the instant invention. These salts such as magnesium chloride may be substantially completely removed from the impure titanium metal product by a simple water leaching operation. After the water leaching operation the product is then ready for the magnesium removal by the process of the instant invention.

Accordingly, an object of this invention is to provide a satisfactory method for removing magnesium metal from impure titanium metal and for rendering said titanium metal amenable to a subsequent arc melting operation. Another object is to provide a method for separating magnesium metal from titanium metal by a leaching operation. A further object is to provide a method for removing magnesium metal and for rendering the titanium metal amenable to an arc melting procedure, said method being simple and economical to employ. These and other objects will become apparent from the following more complete description of the instant invention.

In its broadest aspects the instant invention contemplates a method for treating an impure titanium metal product to remove magnesium metal therefrom and to render said titanium metal amenable to arc melting, which comprises adding said impure titanium metal product into an electrolytic cell having an anode and a cathode, placing said impure titanium metal product in contact with said anode, adding an acidic electrolyte in said cell and passing current through said cell thereby transferring said magnesium metal from said impure product at said anode toward said cathode.

In carrying out the instant process the acidity of the electrolyte which is employed in the cell may vary over a considerable range, however, for reasons of economy and ease of operation it has been found desirable to employ solutions which are dilute with respect to the presence of acidic constituents. For example, the electrolytes should contain from about 0.1% to about 10% acid concentration and such concentrations should be maintained. The amount of acid present should be at least sufficient to react theoretically with all of the magnesium metal present in the impure product and an excess preferably should be employed. It will be appreciated that concentrated acid solutions should be avoided because of the difficulties involved with corrosion and other operating problems. It is obvious that the specific quantity of both the current and acid to be employed in any particular operation will depend upon a variety of factors such as, for example, the amount of contamination which may be present, the physical form of the titanium metal product to be purified, the size of the equipment, etc.

This acid leaching operation may be conducted over a rather wide temperature range. For effective removal of the magnesium metal it has been found suitable under most conditions to initiate the leaching operation at essentially room temperature. Normally an evolution of heat will accompany the leaching operation and the resulting temperature increase appears to produce no ill effects.

The quantity of electricity to be used has been found to be from about one to about fifteen ampere-hours per gram of magnesium contained in the impure titanium metal product.

In order to further illustrate the process of the instant invention the following examples are presented:

Example 1

An impure titanium metal sponge prepared by the process described in U. S. Patent No. 2,205,854 wherein titanium tetrachloride and magnesium metal are reacted at elevated temperatures to form titanium metal and magnesium chloride and the magnesium chloride removed by water-leaching was used for this example. The impure titanium metal contained 17% magnesium metal as a contaminant. Thirty-six grams of this impure titanium metal was placed on a carbon anode in an electrolytic cell containing 1000 grams of water. One-hundred-seventy (170) grams of 35% HCl were added over a period of one hour while current was passed through the cell at 10 amperes. The amount of current used was, therefore, equal to 3.5 ampere-hours per gram of magnesium metal present in the impure titanium metal. The concentration of the acid in the electrolytic cell was maintained between 1% and 5% HCl through the entire run. At the end of 2 hours the metal was removed from the cell, washed with water and dried. Analytical results of the treated metal showed that substantially all of the magnesium metal was removed from the impure product. The pure product was arc melted without any spattering and the melted metal when cooled possessed a Brinell hardness of 200.

*Example II*

Example I was repeated using substantially the same quantities of materials shown in Example I except that the current was passed through the cell at a rate from 6 to 10 amperes over a period of 11 hours. This is equivalent to 14.4 ampere-hours per gram of magnesium metal present. During this period a total of 92 grams of 18% HCl were added at a substantially uniform rate. The concentration of acid in the electrolytic cell was maintained at about 1.5% HCl. At the end of 11 hours the metal was removed, washed with water and dried. Upon arc melting the pure product, no spattering was observed and a steady arc was maintained. The melted metal when cooled possessed a Brinell hardness of 150.

*Example III*

Using the procedure described in Example I and employing substantially the same amounts of materials, Example I was repeated except that the current was passed through the cell at a rate from 1 to 4 amperes over a period of 9 hours. This is equivalent to 3.0 ampere-hours per gram of magnesium metal present in the titanium metal. During this period a total of 200 grams of 18% HCl were added maintaining the acid concentration in the electrolyte between 0.5 and 3.0% HCl. After 9 hours the metal was removed from the cell, washed with water and dried. The metal was then arc melted without spattering and the molten metal when cooled possessed a Brinell hardness of 145.

For comparative purposes and in order to illustrate the effectiveness of the instant invention, another portion of the impure titanium metal product which was employed in Example I was subjected to an acid leaching operation in which the same amount of hydrochloric acid solution was employed as was used in Example I; however, no current was employed. Although apparently the magnesium metal was removed, the titanium metal product could not be suitably employed in a subsequent arc melting operation inasmuch as there was excessive spattering of the titanium metal, and furthermore, it proved impossible to maintain a stable arc during the melting operation.

It has clearly been demonstrated by the examples presented and by the preceding description that according to the process of the instant invention it is possible to effectively remove contaminants such as, for example, magnesium metal from titanium metal by a process in which impure titanium metal product is treated by leaching the product in the presence of an electric current and that the product resulting from such leaching step is particularly amenable to a subsequent arc melting operation. Furthermore, it has been shown that it is possible to accomplish such removal by a leaching operation which is simple and economical to employ and which does not require complex equipment or large amounts of purifying agents.

While this invention has been described and illustrated by the examples shown, it is not intended to be strictly limited thereto and other modifications may be employed within the scope of the following claims.

We claim:

1. Method for removing magnesium metal from impure titanium metal product to render said product amenable to arc melting, which comprises adding said impure product to an electrolytic cell having an anode and a cathode, placing said product in contact with said anode, adding an electrolyte consisting essentially of hydrochloric acid into said cell, the concentration of said acid in said electrolyte being maintained from about 0.1% to about 10%, and passing current through said cell thereby transferring said magnesium metal from said impure product at said anode toward said cathode.

2. Method according to claim 1 in which the amount of acid present in said electrolyte is at least sufficient to react theoretically with all of the magnesium metal present in the impure titanium metal product.

3. Method according to claim 1 in which the current flow through said cell is from about one to fifteen ampere-hours per gram of magnesium metal present in said impure titanium metal.

No references cited.